United States Patent [19]

Okumoto

[11] Patent Number: 4,767,909

[45] Date of Patent: Aug. 30, 1988

[54] METHOD FOR PERFORATING A SHEET-SHAPED MATERIAL AND PERFORATING APPARATUS UTILIZING PULSED LASER BEAMS

[75] Inventor: Yutaka Okumoto, Tokyo, Japan

[73] Assignee: Japan Tobacco Inc., Tokyo, Japan

[21] Appl. No.: 137,371

[22] Filed: Dec. 23, 1987

[30] Foreign Application Priority Data

Jan. 30, 1987 [JP] Japan .................... 62-18224

[51] Int. Cl.⁴ .......................................... B23K 26/00
[52] U.S. Cl. ............................ 219/121.7; 131/281; 219/121.71; 219/121.77
[58] Field of Search ............... 219/121 LK, 121 LL, 219/121 LQ, 121 LR, 121 LT, 121 LP; 131/281

[56] References Cited

U.S. PATENT DOCUMENTS 4,118,619 10/1978 McArthur et al. ............. 219/384 C
4,701,591 10/1987 Masakig et al. ............... 219/121 LT

FOREIGN PATENT DOCUMENTS 0021165 5/1984 European Pat. Off. .
2022492 12/1979 United Kingdom .
2124128 2/1984 United Kingdom .

*Primary Examiner*—C. L. Albritton
*Attorney, Agent, or Firm*—Murray and Whisenhunt

[57] ABSTRACT

A sheet-shaped material such as tipping paper of a cigarette is perforated by comprising the steps of:
(1) generating a circular single pulsed laser beam,
(2) beam-splitting the single pulsed laser beam into first and second pulsed laser beams by utilizing a beam splitting prism,
(3) beam-splitting each of the first and second pulsed laser beams into a plurality of split pulsed laser beams having substantially equal focusing points by utilizing each of first and second mirror polygons, and
(4) perforating the sheet-shaped material by use of the plurality of split pulsed laser beams having the substantially equal focusing points while transporting the sheet-shaped material.

19 Claims, 7 Drawing Sheets

METHOD FOR PERFORATING A SHEET-SHAPED MATERIAL AND PERFORATING APPARATUS UTILIZING PULSED LASER BEAMS

BACKGROUND OF THE INVENTION

1. Field of the Invention

The present invention relates to a method for perforating a sheet-shaped material or web by employing pulsed laser beams, and an apparatus for perforating such a material by the pulsed laser beams.

2. Description of the Related Art

A technique of forming plural fine holes through a sheet-shaped material (web) is widely used in a tabacco processing industry.

A cigarette equiped with a filter is produced by combining a cigarette rod with a filter rod and then wrapping a tipping paper around the cigarette rod combined with the filter rod. Normally, a pair of cigarettes with the filters are prepared by the combination of two cigarettes, and such combined cigarette is finally cut at its center to produce two pieces of cigarettes with the filter.

The tipping paper to be wrapped around the filter and also the cigarette is supplied by cutting a sheet-shaped material wound around a reel into small pieces with a predetermined size.

The tipping paper is formed with a ventilation area where plural fine holes are formed, so that tar and nicotine may be readily adsorbed by the filter in smoking, that is, a so-called dilution characteristic may be exhibited.

To achieve the above dilution characteristic, the ventilation area of the tipping paper is required to have a desired fine hole pattern composed of plural fine holes having a uniform shape and accurately positioned.

As previously described, the tipping paper is produced as a sheet-shaped material having a width corresponding to a double-length of cigarette during the cigarette producing process. Accordingly, it is preferable to form two rows of fine hole patterns which extend along a longitudinal axis of the sheet-shaped material.

Such fine hole patterns are formed by utilizing a pulsed laser beam at present. Generally, the pulsed laser beam is generated based upon the following two typical beam generating methods.

The first generating method is to pulse a continuous laser beam by means of a rotating reflecting disk.

The reflecting disk is provided at its circumference with beam reflecting elements and beam passing openings. A plurality of the reflecting disks are arranged so as to obtain a desired fine hole pattern on the sheet-shaped material. Thus, the pulsed laser beam is irradiated on the moving sheet-shaped material to thereby form arrays of fine holes along the longitudinal axis of the material.

Such a continuous laser generating method is known from, for instance, U.S. Pat. No. 4,118,619, GB patent No. 2002492 and European patent No. 21165.

The second generating method is to directly generate a pulsed laser beam.

In the second generating method, a pulsed laser beam is split by a partially light permeable mirror and a total reflecting mirror, and thereafter the split beams are irradiated onto the moving sheet-shaped material to thereby form the plural arrays of the fine hole pattern.

The above-described pulsed laser generating method is known from, for instance, GB patent No. 2124128-A.

However, in these conventional perforating techniques by employing a pulsed laser beam so as to form a desired fine hole pattern on a sheet-shaped material, a complex perforating system having many optical elements is required. Accordingly, the number of elements required for precise adjustment is necessarily increased, resulting in an expensive perforating system.

In, on the other hand, the pulsed laser generating method, a waveform of the once oscillated pulsed beam will tail for a period of about 1 msec even after an exciting current is interrupted, due to the inherent characteristic of $CO_2$ gas laser. For this reason, the succeeding pulsed laser beam cannot be continuously oscillated at a short interval. That is, to increase a pulse oscillation frequency, a certain limitation exists to block high-speed perforating operation. Moreover, the resultant fine holes have spindle shapes. The formation of such spindle-shaped fine holes causes a problem such that adjacent spindle-shaped fine holes are coupled to newly form a large hole. As a result, it is practically impossible to provide filter tipping paper having desirable precise dilution characteristics.

The present invention has been therefore accomplished to solve the above-described conventional drawbacks, and has an object to provide a perforating method and apparatus which is simple in optical arrangement with less adjusting elements and can form desirable fine hole patterns at a high efficiency by using a large quantity of split beam obtained from a pulsed laser beam.

SUMMARY OF THE INVENTION

The above and other objects of the invention are realized, using a method for perforating a sheet-shaped material (16), comprising the steps of:

generating a single pulsed laser beam (29:32) having a substantially circular shape;

beam-splitting said single pulsed laser beam of the substantially circular shape (29:32) into first and second pulsed laser beams (33A:33B) by utilizing a beam splitting prism (27);

beam-splitting each of said first and second pulsed laser beams (33A:33B) into a plurality of split pulsed laser beams (39A:39B) having substantially equal focusing points by utilizing each of first and second mirror polygons (26A:26B); and perforating the sheet-shaped material (16) by use of said plurality of split pulsed laser beams (39A:39B) having the substantially equal focusing points while transporting the sheet-shaped material (16).

Furthermore, according to the present invention, an apparatus (100) for perforating a sheet-shaped material (16) is characterized by comprising:

a laser generator (28) for generating a single pulsed laser beam (32) having a substantially circular shape;

a beam splitter (27) for beam-splitting the single pulsed laser beam (32) of the substantially circular shape into first and second pulsed laser beams (33A:33B);

a first mirror polygon (26A) for beam-splitting the first pulsed laser beam (33A) into a plurality of third pulsed laser beams (39A) having substantially equal focusing points;

a second mirror polygon (26B) for beam-splitting the second pulsed laser beam (33B) into a plurality of fourth pulsed laser beams (39B) having substantially equal focusing points; and a guiding device (18:20A:20B) for guiding the sheet-shaped material (16) along a curve defined by the above-described substantially equal focusing points of the third and fourth pulsed laser beams (39A:39B), whereby the first and second mirror polygons (26A:26B) are fixed while perforating the sheet-shaped material (16), and upper and lower portions of the sheet-shaped material (16) with respect to a longitudinal axis thereof are perforated by the third and fourth pulsed laser beams (39A:39B), respectively, while being transported along the guiding device (18:20A:20B).

BRIEF DESCRIPTION OF THE DRAWING

For a better understanding of the above and other objects of the present invention, reference is made to the following detailed description of the invention to be read in conjunction with the following drawings, in which.

DETAILED DESCRIPTION OF THE PREFERRED EMBODIMENT

BASIC IDEA

Before proceeding with various types of preferred embodiments according to the invention, a basic idea of the perforating method of the invention will now be described.

A single pulsed laser beam is generated from a pulsed laser beam generating source, and the axis of the beam is projected on the crest of a prism to split the generated pulsed laser beam into two beams. Then, the two split pulsed laser beams are guided by optical elements. Thereafter, while, the respective axes of the laser beams are made coincident with the longitudinal axes of two mirror polygons, each of the split beams are projected on the vertexes of the mirror polygons. As a result, each of two pulsed laser beams reflected on the mirror polygons is split into a plurality of pulsed laser beams, and the resultant pulsed laser beams are irradiated on a moving sheet-shaped material so as to form fine holes or perforations. In this case, the sheet-shaped material is transported via the rotating guide drum along a line defined by a focal distance of the pulsed laser beams apart from the axis of the respective mirror polygons.

In this manner, desirable fine holes patterns may be formed on the sheet-shaped material.

In this case, the mirror polygons may be fixed or rotated while perforating the sheet-shaped material.

Specifically, these mirror polygons may be rotated in such a manner that the transporting speed of the sheet-shaped material is synchronized with a moving speed of the foci of the split pulsed laser beams on the sheet-shaped material. Further, the axis of each rotating guide drum on which the sheet-shaped material is transported is made coincident with the axis of each mirror polygon (i.e., the beam axes of the laser beam incident thereupon), or is intersected therewith at a predetermined angle $\theta$.

In the case that the guide drums are inclined at the predetermined angle $\theta$, a plurality of fine hole arrays are formed at a slightly inclined angle ($\theta$) relative to the transporting direction of the sheet-shaped material across the width of the sheet-shaped material by irradiating the split pulsed laser beams onto the sheet-shaped material.

The basic idea of the perforating method according to the present invention as mentioned above is constituted of the following four technical ideas.

First, initial conditions are such that a single pulsed laser beam is split into two pulsed laser beams having a substantially sectionally semicircular shape, and the split laser beams are projected onto first and second mirror polygons to be further split into a large quantity of pulsed laser beams. That is, a plurality of pulsed laser beams are generated to be projected toward the sheet-shaped material. Further, these mirror polygons may be fixed or rotated while perforating the material. Specifically, they may be rotated at the same speed as the sheet-shaped material.

(1) FIRST PERFORATING METHOD

The first and second mirror polygons are fixed, and the axes of the mirror polygons are substantially parallel to the width direction of the sheet-shaped material (namely, a direction perpendicular to a transport direction of the sheet-shaped material), that is, the inclined angle $\theta$ is set to zero. To this end, an axis of each rotating guide drum for transporting the sheet-shaped material is arranged in parallel with the axis of each mirror polygon. Under these perforating conditions, the sheet-shaped material is perforated by the these split pulsed laser beams while being transported. As a result, upper and lower rows of fine holes (each row comprising a single line) across the width of the sheet-shaped material are formed in a direction substantially parallel to the longitudinal direction of the sheet-shaped material, thus forming a desired fine hole pattern.

(2) SECOND PERFORATING METHOD

Similarly, the first and second mirror polygons are fixed, and the width direction of the sheet-shaped material is inclined at a predetermined inclined angle $\theta \neq 0°$. To this end, the axis of each rotating guide drum for transporting the sheet-shaped material is inclined at a predetermined angle relative to the axis of each polygon (the axis of each pulsed laser beam). Under the above perforating conditions, the sheet-shaped material is perforated by these split pulsed laser beams while being transported. As a result, upper and lower rows of fine holes (each row comprising a plurality of lines) across the width of the sheet-shaped material are formed at the angle $\theta$ relative to the longitudinal direction of the sheet-shaped material, thus forming a desired fine hole pattern.

(3) THIRD PERFORATING METHOD

The first and second mirror polygons are rotated at a speed synchronous or asynchronous with the transport speed of the sheet-shaped material, and each axis of the mirror polygons is positioned in parallel with the width direction of the sheet-shaped material (namely, the inclined angle $\theta$ is set to zero). To this end, the rotating guide drum is set in the same manner as with the aforementioned first perforating method. Under the perforating conditions, the sheet-shaped material is perforated by these split pulsed laser beams while being transported. As a result, upper and lower rows of fine holes (each row comprising a single line) across the width of the sheet-shaped material are formed in a direction substantially parallel to the longitudinal direction of the sheet-shaped material, thus forming a desired fine hole pattern.

(4) FOURTH PERFORATING METHOD

In the same manner as the third perforating method, the first and second mirror polygons are rotated at a speed synchronous or asynchronous with the transport speed of the sheet-shaped material. Moreover, the width direction of the sheet-shaped material is inclined at a predetermined inclined angle $\theta \neq 0°$. To this end, the rotating guide drum is set in the same manner as with the aforementioned second perforating method. Under the perforating conditions, the sheet-shaped material is perforated by these split pulsed laser beams while being transported. As a result, upper and lower rows of fine holes (each row comprising a plurality of lines) across the width of the sheet-shaped material are formed at the angle $\theta$ relative to the longitudinal direction of the sheet-shaped material, thus forming a desired fine hole pattern.

ARRANGEMENT OF PERFORATING APPARATUS

Figure 1:
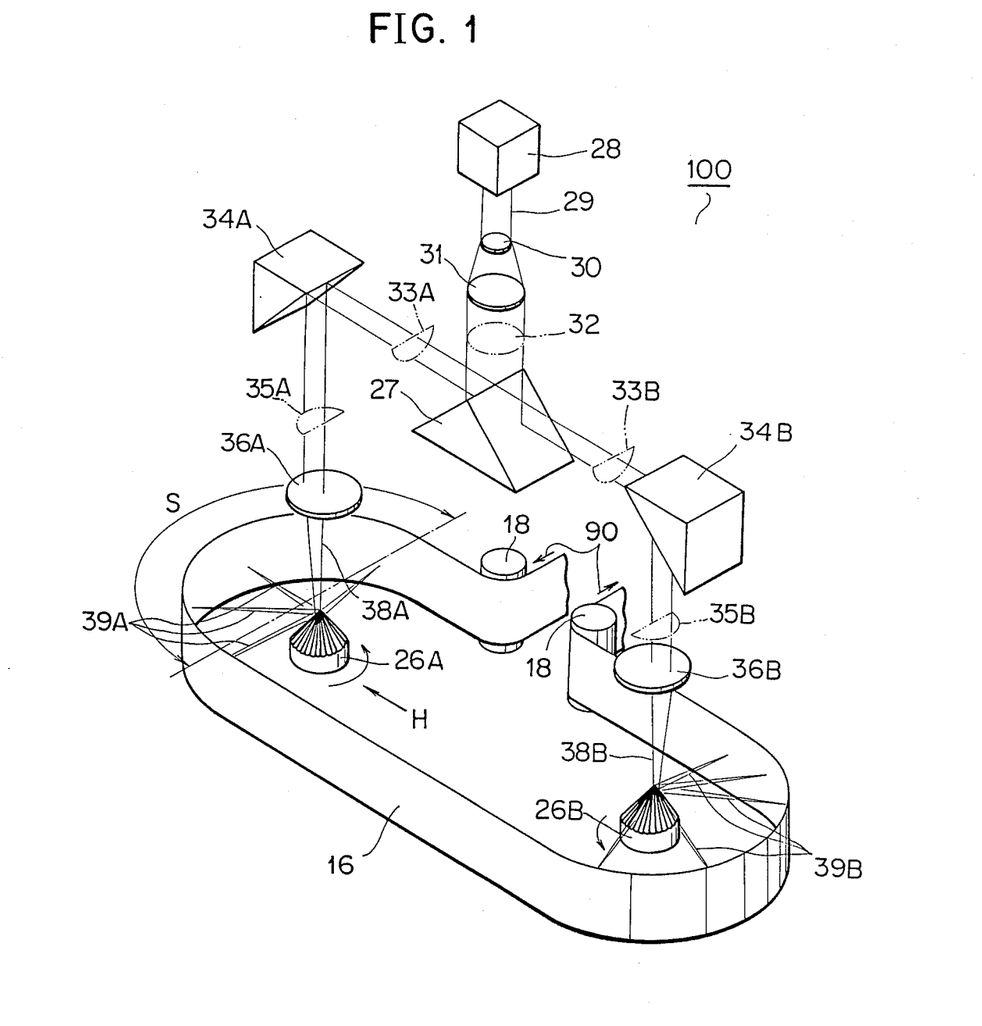
FIG. 1 is an illustration of a perforating apparatus 100 according to one preferred embodiment of the invention.

Referring now to FIG. 1, a perforating apparatus 100, according to the invention, will be described where the above-described four perforating methods can be executed.

In the perforating apparatus 100, a single pulsed laser beam 29 generated from a pulsed laser beam generating source 28 is enlarged by first and second lenses 30 and 31 to form a parallel beam 32 having a substantially circular shape.

This circular pulsed laser beam 32 is projected onto the prism 27 in such a manner that the beam axis thereof is coincident with the crest of the prism 27, and thus is split into two semicircular first and second split pulsed laser beams 33A and 33B. The first and second semi-circular split pulsed laser beams 33A and 33B are projected on first and second reflecting mirrors 34A and 34B, respectively, and are reflected thereon. These reflected first and second split laser beams 35A and 35B pass through third and fourth lenses 36A and 36B, respectively, and are converged to form first and second converged pulsed laser beams 38A and 38B. The first and second converged pulsed laser beams 38A and 38B are projected on first and second mirror polygons 26A and 26B, respectively, under the condition that respective beam axes of reference lines "L" (which will be hereinafter described) of the first and second converged pulsed laser beams 38A and 38B lie on the respective vertexes of the mirror polygons 26A and 26B, thus forming a large quantity of pulsed laser beams 39A and 39B. These pulsed laser beams 39A and 39B focus on a sheet-shaped material 16, and as a result, a large quantity of fine holes P and Q are formed (see FIG. 5).

The above-mentioned perforating operation is conducted while the sheet-shaped material 16 is transported around the first and second mirror polygons 26A and 26B at a predetermined speed in the direction shown by an arrow 90.

The modes of the perforating operation are in accordance with the aforementioned four perforating methods.

MATERIAL TRANSPORT MECHANISM

Figure 2:
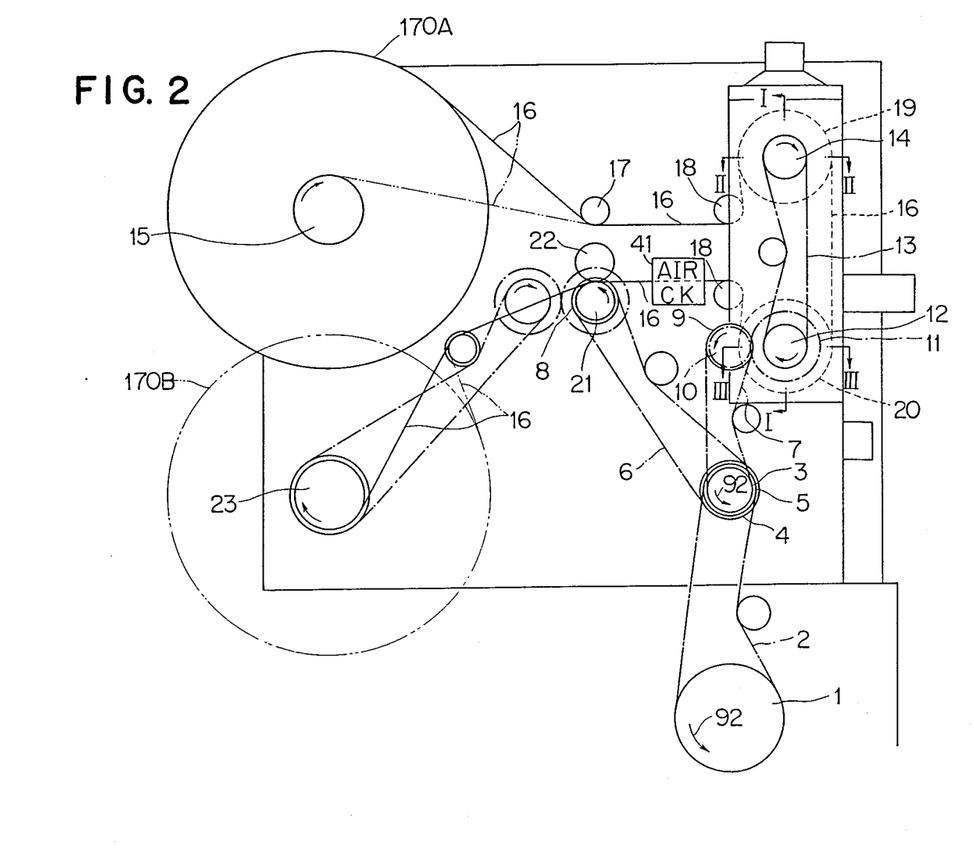
FIG. 2 schematically illustrates a transport mechanism for a sheet-shaped material employed in the perforating apparatus 100 shown in FIG. 1.

FIG. 2 schematically illustrates a transport mechanism for the sheet-shaped material or web 16.

For the sake of simplifying the drawing of the transport mechanism, the members such as the main frame not directly relating to the invention will be omitted in the following description.

Referring to FIG. 2, a timing pulley 1 receives a torque of an output shaft of a motor (not shown) to rotate a timing pulley 3 through a timing belt 2 in the direction of an arrow 92.

Timing pulleys 4 and 5 fixed coaxially with the timing pulley 3 cause timing pulleys 8 and 9 to be rotated through corresponding timing belts 6 and 7.

A pinion 10 fixed coaxially with the timing pulley 9 is geared with a gear 11, and a timing pulley 12 fixed coaxially with the gear 11 enables a timing pulley 14 to be rotated through a timing belt 13 at the same speed.

The sheet-shaped material 16 wound around a feed reel 15 are guided by guide rollers 17 and 18, and are fed through the outer peripheries of guide drums 19 and 20 to a feed roller 21 fixed coaxially with the timing pulley 8. Then, the sheet-shaped material 16 depressed between the feed roller 21 and a pinch roller 22 is wound up by a take-up reel 23.

Reference numerals 170A and 170B designate maximum diameters of the sheet-shaped material 16 wound around the feed reel 15 and the take-up reel 23, respectively.

The remaining arrows shown represent rotational directions of the corresponding pulleys and reels.

OPTICAL SYSTEM

Figure 3:
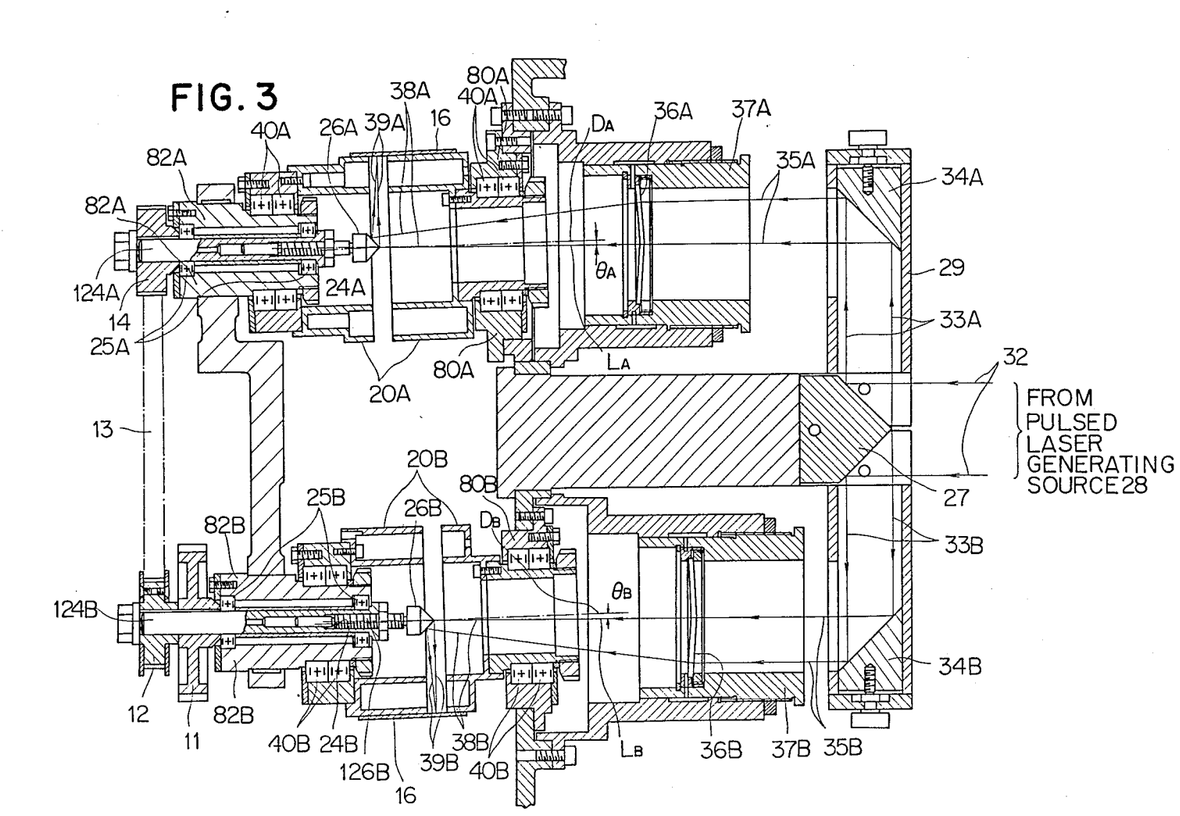
FIG. 3 schematically illustrates an optical system employed in the perforating apparatus 100 shown in FIG. 1.

Referring to FIG. 3, an optical system of the perforating apparatus 100 will now be described. FIG. 3 is a sectional view taken along the line I—I of the transport mechanism shown in FIG. 2. It should be noted that in the above-described sectional view, only material guide drums 20A and 20B are shown by a cross-sectional view taken along the lines II—II and III—III so as to clarify the inclined conditions thereof.

As shown in FIG. 3, a shaft 124B on which the gear 11 and the timing pulley 12 (at left bottom as viewed in FIG. 3) are fixed, is rotatably supported by a bearing 25B. A tappered hole 24B is formed in the shaft 124B in coaxial relationship with the outer circumference of the shaft 124B. A screw 126B is coaxially projected from the second mirror polygon 26B, and is treatedly engaged with the tapped hole 24B of the shaft 124B. The second mirror polygon 26B has a large quantity of optical reflecting surfaces (see FIG. 1) each having the same inclined angle relative to a center line passing through the axis.

On the other hand, a shaft 124A on which the timing pulley 14 (at left top as viewed in FIG. 3) connected through the timing belt 13 to the timing pulley 12 is fixed, is supported by a bearing 25A, and is treatedly engaged coaxially with the first mirror polygon 26A having the same shape as the second mirror polygon 26B.

Reference numeral 27 indicates a prism (at right center as viewed in FIG. 3). As shown in FIG. 1, the prism 27 is located in a position such that after the pulsed laser beam 29 generated from the pulsed laser beam generating source 28 is enlarged by the first and second lenses 30 and 31, the enlarged pulsed laser beam 32 is split to form first and second semi-circular beams 33, under condition that the axis of the circular beam 32 coincides with the crest of the prism 27.

The first and second reflecting mirrors 34A and 34B are located along the light paths of the sectionally semi-circular first and second pulsed laser beams 33A and 33B as split by the prism 27. The laser beams 33A and 33B are perpendicularly (horizontally as viewed in FIG. 3) reflected on the first and second reflecting mirrors 34A and 34B, respectively, to form the beams 35A and 35B. The third and fourth lenses 36A and 36B are located along the light paths of the laser beams 35A and 35B, respectively.

The positions of the third and fourth lenses 36A and 36B are adjustable by the threads (see FIG. 3) formed on the outer circumferences of first and second lens housings 37A and 37B, respectively, to thereby adjust the foci of the first and second converged pulsed laser beams 38A and 38B having passed through the third and fourth lenses 36A and 36B.

The first and second converged laser beams 38A and 38B each having a semi-circular shape are projected in such a manner that the axes of the beams 38A and 38B (reference lines $L_A$ and $L_B$) coincide with the vertexes of the first and second mirror polygons 26A and 26B, respectively. As a result, the first and second reflected pulsed laser beams 39A and 39B reflected on the plural mirror surfaces of the mirror polygons 26A and 26B are split into plural laser beams in the approximately 180° range of the outer peripheries of the mirror polygons 26A and 26B, and are focused at the points equally spaced from the axes (reference lines $L_A$ and $L_B$) of the first and second mirror polygons 26A and 26B.

The first and second rotating guide drums 20A and 20B for transporting the sheet-shaped material 16, each drum comprising a pair of upper and lower drum elements, are divided so as not to interrupt the respective light paths of the first and second pulsed laser beams 39A and 39B, respectively, and are rotatably supported by bearings 40A and 40B through bearing housings 80A and 80B for the upper drums, and bearing housings 82A and 82B for the lower drums, each being arranged around the mirror polygons 26A and 26B.

The sheet-shaped material 16 are wound on the semi-circular portion of the outer circumference of the first and second guide drums 20A and 20B, and the outer diameters of the first and second guide drums 20A and 20B are determined in such a manner that the first and second laser beams 39A and 39B are focused on the sheet-shaped material 16.

FINE HOLE PATTERNS

Figure 4:
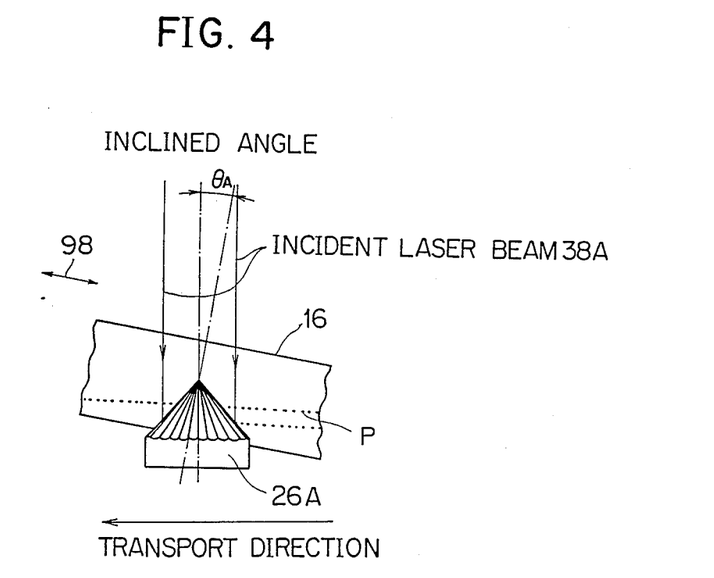
FIG. 4 is an illustration for explaining the perforating operation by the mirror polygon 26A.

In the case that the center axes $D_A$ and $D_B$ of the first and second guide drums 20A and 20B are made coincident with the corresponding reference lines $L_A$ and $L_B$ of the first and second beams 39A and 39B, the foci of these first and second split pulsed laser beams 39A and 39B are arranged parallel with the longitudinal direction (shown by the arrow 98) of the sheet-shaped material 16. On the other hand, when the center axes $D_A$ and $D_B$ are inclined with respect to the corresponding reference lines $L_A$ and $L_B$ by a small angle $\theta_A$ ($=\theta_B$), the sheet-shaped material 16 is inclined with respect to the first and second beams 38A and 38B as well as the first and second mirror polygons 26A and 26B, as shown in FIG. 4. Accordingly, the fine hole patterns P and Q formed at the foci of the first and second beams 39A and 39B apart from the first and second mirror polygons 26A and 26B are slightly inclined (at the inclined angles $\theta_A$ and $\theta_B$) relative to the longitudinal axis of the sheet-shaped material 16.

Figure 5:
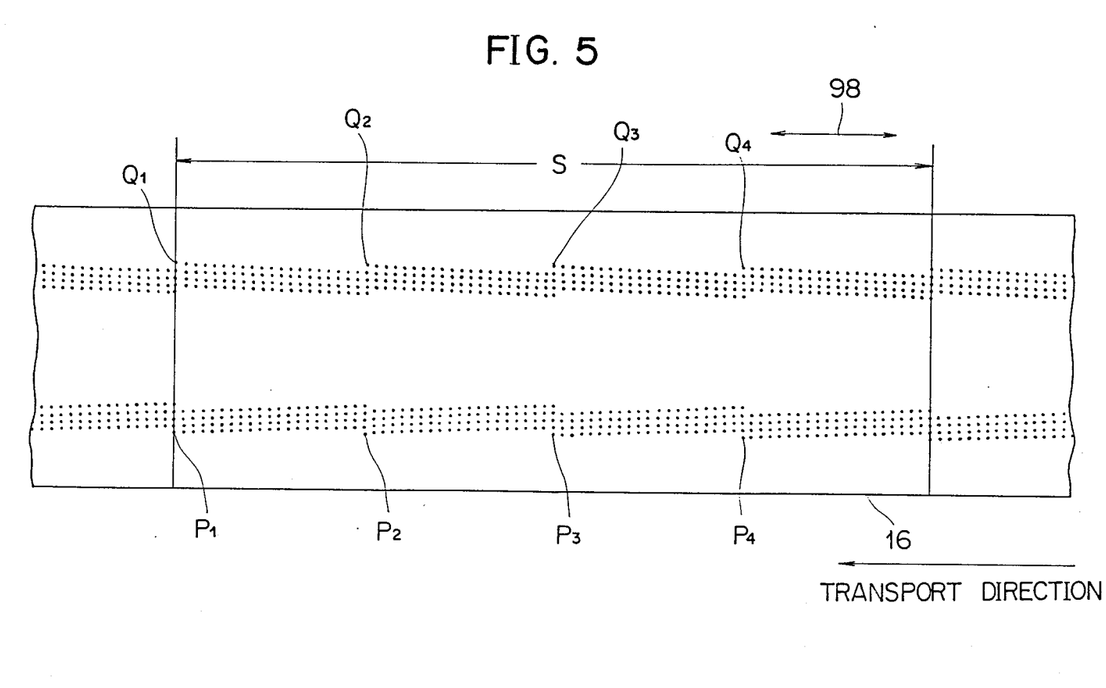
FIG. 5 schematically illustrates fine hole patterns formed on the sheet-shaped material.

One pattern of fine holes P is formed in the lower half area of the sheet-shaped material 16 whereas another pattern of the fine holes is formed in the upper half area as shown in FIG. 5.

Hole arrays $P_1$ and $Q_1$ formed by the corresponding first and second split pulsed laser beams 39A and 39B are arranged almost symmetrically with respect to the longitudinal axis of the sheet-shaped material 16. The length "S" of the hole arrays is equal to a contact length of the sheet-shaped material 16 contacting the semi-circular portion of the outer circumference of the first and second guide drums 20A and 20B (see FIG. 1).

Further, as the transporting direction of the sheet-shaped material 16 is shifting inclined with respect to the first and second mirror polygons 26A and 26B, new successive fine hole arrays $P_2$ and $Q_2$ are formed adjacent to the preceding hole arrays $P_1$ and $Q_1$, respectively, by the next one of the first and second split pulsed laser beams 39A and 39B generated after a fixed period of time.

The fine hole patterns as formed in this manner are substantially symmetrical with respect to the longitudinal axis of the elongated sheet-shaped material 16, as illustrated in FIG. 5.

A description will now be made of a method of forming the fine hole patterns.

First, since in the optical system shown in FIG. 3, the cylindrical shafts 84A and 84B and the bearing housings 80A, 80B, 82A and 82B are replaced with suitable ones, the center axes $D_A$, $D_B$ of the first and second transporting drums 20A and 20B are inclined at each predetermined angle of $\theta_A$ ($=\theta_B$) relative to the reference lines $L_A$ and $L_B$ of the first and second split pulsed laser beams 38A and 38B, respectively. The first and second mirror polygons 26A and 26B are rotated at the speed substantially synchronous with the transportation speed of the sheet-shaped material 16 wound around the first and second guide drums 20A and 20B by the timing pulleys 12 and 14 rotating in response to the torque from the motor (not shown).

Accordingly, under the condition shown in FIG. 3, the fourth perforating method of the above-described four perforating methods according to the present invention is performed. As a result, the fine hole patterns constructed of the fine holes P and Q are formed at the upper and lower regions across the width of the sheet-shaped material 16 as shown in FIG. 5.

Then, the first perforating method may be readily performed by using the apparatus shown in FIG. 3 in the following manner. That is, the timing belt 13 and other components are substituted, and any rotation system for the first and second mirror polygons 26A and 26B is stopped by known means to thereby fix the mirror polygons 26A and 26B. Further, in order to set the pattern inclined angles $\theta_A$ and $\theta_B$ to zero, the components such as the cylindrical shafts 84A and 84B and the bearing housings 80A, 80B, 82A and 82B may be replaced with other equivalent component.

It is apparent that the remaining perforating methods may be also easily executed by suitably selecting the above-mentioned known means.

In the optical system shown in FIG. 3, the fine holes P and Q are arranged closely and regularly every time one pulsed laser beam is generated (see FIG. 5).

Thus, the sheet-shaped material 16 having plural fine holes P and Q with a uniform ventilation degree may be produced with a high efficiency along the longitudinal direction.

The ventilation degree of the sheet-shaped material 16 is checked by a ventilation degree checking device 41, shown in FIG. 2, provided upstream of the feed roller 21 during pass of the material 16 through the checking device 41. If the ventilation degree is out of the reference value, a signal representative of this abnormal ventilation is fed back to a controller (not shown in detail) in the laser beam generating source 28 to automatically adjust the ventilation degree by way of the known laser controlling.

The checking of the ventilation degree is conducted by measuring an amount of air passing through the fine holes P and Q, that is, measuring an opening degree of the fine holes P and Q. The, the checking output signal derived from the ventilation degree checking device 41 is fed back to the controller in the pulsed laser beam generating source 28 so as to control the exciting current of the laser generator.

For instance, when the ventilation degree is lower than a predetermined value as the result of the measurement of the ventilation degree, the controller is operated to increase the exciting current to the laser generator 28.

PRACTICAL DATA

The Applicant conducted the second perforating method and the fourth perforating method, using the above-mentioned perforating apparatus 100 according to the preferred embodiment. As a result, the following practical data could be obtained.

First, the results of the second perforating method will now be described.

The first and second mirror polygons 26A and 26B were fixed, and the center axes of the first and second transporting or guiding drums 20A, 20B, were inclined at an angle of 1°30' with respect to the respective reference lines $L_A$ and $L_B$ of the incident pulsed laser beams 38A and 38B. The number of the reflecting mirrors in the mirror polygons 26A and 26B was 8 for each polygon. A transportation speed of the sheet-shaped material 16 was selected to be 1 m/sec. A laser output power of the pulsed laser beam generating source 28 was approximately 1 KW. The outer diameter of the respective first and second guiding drums 20A, 20B was 100 mm. A pulse oscillation frequency of the pulsed laser beam 29 was selected to be about 1000 Hz. While the sheet-shaped material was transported over a distance of 157 mm on the first or second guiding drum 20A or 20B, the pulsed laser beam 39A or 39B was irradiated 157 times. As a result, an amount of air passing through the fine hole patterns formed on the sheet-shaped material 16 was 600 ml/min·cm²·100 mmAq.

Figure 6:
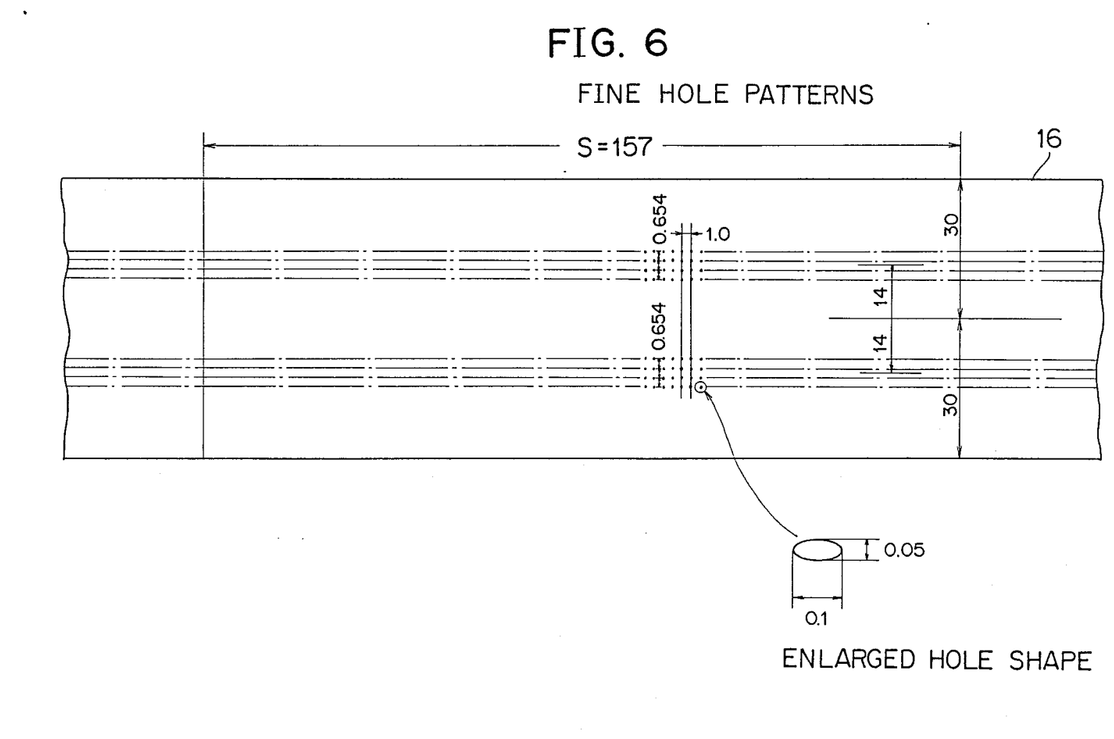
FIG. 6 schematically illustrates fine hole patterns formed in accordance with the second perforating method of the invention.

The sheet-shaped material 16 perforated under the above-mentioned conditions is partially shown in FIG. 6. The unit of each dimension is millimeter. In the preferred embodiment, 1256 fine holes were perforated on the sheet-shaped material 16 having a length "S" of 157 mm.

As is apparent from the enlarged hole shape shown at the lower region in FIG. 6, the shape of the fine hole formed is an elongated circular shape.

Secondly, the results of the fourth perforating method will now be described.

The perforating operation was executed while the first and second mirror polygons 26A and 26B were rotated at the substantially same speed as the transportation speed of the sheet-shaped material 16. Then, in the same manner as the previous experiment, the axes of the first and second guiding drums 20A and 20B were inclined at an angle of 1°30' relative to the center axes of the mirror polygons 26A and 26B, or the beam axes $L_A$, $L_B$ of the pulsed laser beams 38A, 38B incident thereon. The number of the reflecting mirror in the mirror polygons 26A and 26B was selected to be 300 for each polygon, and the transportation speed of the sheet-shaped material 16 was set to 5 m/sec. The laser output power of the pulsed laser beam generating source 28 was selected to be about 5 KW. The outer diameter of the transporting drums was 100 mm. The pulse oscillation frequency of the pulsed laser beam 29 was selected to be about 127.55 Hz. As the result, while the sheet-shaped material 16 was transported over the range of 157 mm on the first and second guiding drums 20A and 20B having a diameter of 100 mm, the pulsed laser beam 39A or 39B was irradiated four times. Therefore, an amount of air passing through the fine hole patterns formed on the sheet-shaped material 16 was 300 ml/min·cm²·100 mmAq.

Figure 7:
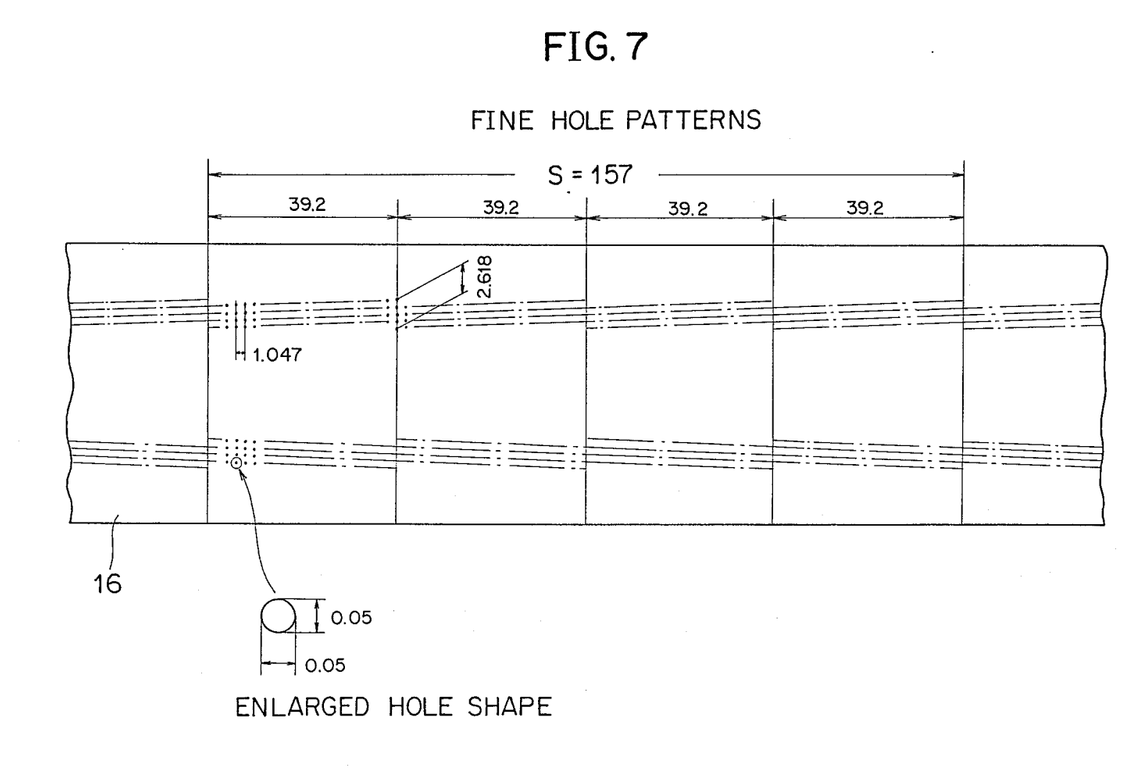
FIG. 7 schematically illustrates fine hole patterns formed in accordance with the fourth perforating method of the invention.

The sheet-shaped material 16 perforated under the above-mentioned conditions is shown in FIG. 7. In this case, 1200 fine holes were formed on the sheet-shaped material 16 having a length "S" of 157 mm.

A focal distance of each of split pulsed laser beams 39A and 39B was about 50 mm from the center axes $L_A$ and $L_B$ of the mirror polygons 26A and 26B.

As is obvious from the enlarged hole shape shown at the lower region in FIG. 7, the shape of the fine hole formed is a substantially completely circular shape. Thus, it is apparent that the shape of the fine hole formed by the preferred embodiment is ideal, as compared with the conventional spindle-like shape.

The feature of the perforating method and apparatus according to the present invention as mentioned above in detail will now be summarized.

The single pulsed laser beam 29 having a substantially circular shape is generated from the pulsed laser beam generating source 28. The axis of the laser beam 29 is coincident with the crest of the prism 27, and is split into two semi-circular first and second pulsed laser beams 33A and 33B. These laser beams 33A and 33B are projected on the vertexes of the mirror polygons 26A and 26B, respectively, and are reflected on the mirror polygons 26A and 26B to be split into plural laser beams in the range of approximately 180°. The plural laser beams are focused on the sheet-shaped material 16 with a fixed focal distance. The foci of the beams 39A and 39B are moved on the sheet-shaped material 16 while the mirror polygons 26A and 26B are rotated.

The sheet-shaped material 16 moving along the first and second guiding drums 20A and 20B for feeding and guiding the sheet-shaped material 16 is moved synchronously or asynchronously with the moving speed of the beams within the foci of the beams. Accordingly, a large quantity of fine holes P and Q may be formed on the sheet-shaped material 16 by one pulsed laser beam.

Furthermore, since the present invention employs the two perforating means 26A and 26B, the fine hole patterns are formed at the opposite regions in the width direction along the longitudinal axis of the sheet-shaped material 16, the perforating operation for two cigarettes is accomplished at the same time.

MODIFICATIONS

While the invention has been described in terms of certain preferred embodiments, and exemplified with respect thereto, those skilled in the art will readily appreciate that various modifications, changes, omissions and substitutions may be made without departing from the spirit of the invention.

Although the number of the reflecting mirrors employed in the mirror polygons 26A and 26B was 8 or 300 in the previous embodiments, the number of these reflecting-mirrors is determined in consideration of the transport speed of the sheet-shaped material 16 and the laser power output.

The following various effects are achieved by the perforating method and apparatus of the present invention as described above in detail.

According to the present invention, since the pulsed laser beam is split into plural beams by the mirror polygon having the reflecting mirrors on the entire surface, the construction of the present invention is simplified more greatly than that of the conventional perforating device.

For the same reason as above, the optical system is simplified with less optical components to be adjusted. Further, the apparatus is compact as a whole, and it is inexpensive. The pulsed laser beam having a circle generated from the laser beam generator is split into two semi-circular beams by the triangle prism, and each semi-circular beam is further split into a large quantity of pulsed laser beams by the mirror polygon over the range of 180° thereof. The split laser beams are focused on the semi-circular path of the sheet-shaped material around the respective mirror polygons. That is, the focal distances of the split laser beams are made equal to simultaneously form a semi-circle of the foci.

According to the present invention, as the sheet-shaped material is simultaneously perforated along its longitudinal direction, the number of holes to be simultaneously formed may be easily increased by increasing the number of the reflecting mirror of the mirror polygon. Further, a plenty of fine holes may be formed across the width of the sheet-shaped material, and the fine hole patterns having a desired ventilation degree may be formed by intersecting the axis of the guiding drum with the axis of the mirror polygon, i.e., inclined conditions.

In addition, since the perforating apparatus of the present invention can perforate the sheet-shaped material to form a large quantity of fine holes at the same time, the sheet-shaped material to be transported at high speeds may be suitably perforated by the pulsed laser beams even having a relatively low oscillation frequency, thereby increasing a total quantity of the sheet-shaped material to be perforated per unit time.

What is claimed is:

1. A method for perforating a sheet-shaped material, comprising the steps of:
    generating a single pulsed laser beam having a substantially circular shape;
    beam-slitting said single pulsed laser beam of the substantially circular shape into first and second pulsed laser beams by utilizing a beam splitting prism;
    beam-splitting each of said first and second pulsed laser beams into a plurality of split pulsed laser beams having substantially equal focusing points by utilizing each of first and second mirror polygons; and
    perforating the sheet-shaped material by use of said plurality of split pulsed laser beams having the substantially equal focusing points while transporting the sheet-shaped material.

2. A method for perforating a sheet-shaped material as claimed in claim 1, wherein said first and second mirror polygons are fixed while perforating the sheet-shaped material by utilizing said plurality of split pulsed laser beams.

3. A method for perforating a sheet-shaped material as claimed in claim 2, wherein a transversal perpendicular to a longitudinal axis of the sheet-shaped material is arranged parallel to each beam axis of said first and second pulsed laser beams.

4. A method for perforating a sheet-shaped material as claimed in claim 2, wherein a transversal perpendicular to a longitudinal axis of the sheet-shaped material is inclined at a predetermined angle with respect to each beam axis of said first and second pulsed laser beams.

5. A method for perforating a sheet-shaped material as claimed in claim 1, wherein said first and second mirror polygons are rotated at a predetermined speed while perforating the sheet-shaped material by utilizing said plurality of split pulsed laser beams.

6. A method for perforating a sheet-shaped material as claimed in claim 5, wherein a transversal perpendicular to a longitudinal axis of the sheet-shaped material is arranged parallel to each beam axis of said first and second pulsed laser beams.

7. A method for perforating a sheet-shaped material as claimed in claim 5, wherein a transversal perpendicular to a longitudinal axis of the sheet-shaped material is inclined at a predetermined angle with respect to each beam axis of said first and second pulsed laser beams.

8. A method for perforating a sheet-shaped material as claimed in claim 5, wherein said first and second mirror polygons are rotated at a speed substantially equal to a transportation speed of the sheet-shaped material, while perforating the sheet-shaped material by utilizing said plurality of split pulsed laser beams.

9. A method for perforating a sheet-shaped material as claimed in claim 8, wherein a transversal perpendicular to a longitudinal axis of the sheet-shaped material is arranged parallel to each beam axis of said first and second pulsed laser beams.

10. A method for perforating a sheet-shaped material as claimed in claim 8, wherein a transversal perpendicular to a longitudinal axis of the sheet-shaped material is inclined at a predetermined angle with respect to each beam axis of said first and second pulsed laser beams.

11. A method for perforating a sheet-shaped material as claimed in claim 1, wherein said circular single pulsed laser beam is beam-split by projecting a beam center thereof onto a ridge of a triangle beam splitting prism to derive said first and second pulsed laser beams each having a substantially semicircular shape.

12. An apparatus for perforating a sheet-shaped material, comprising:

means for generating a single pulsed laser beam having a substantially circular shape;

means for beam-splitting said single pulsed laser beam of the substantially circular shape into first and second pulsed laser beams;

first mirror polygon means for beam-splitting said first pulsed laser beam into a plurality of third pulsed laser beams having substantially equal focusing points;

second mirror polygon means for beam-splitting said second pulsed laser beam into a plurality of fourth pulsed laser beams having substantially equal focusing points; and, means for guiding the sheet-shaped material along a curve defined by said substantially equal focusing points of said third and fourth pulsed laser beams, whereby said first second mirror polygons are fixed while perforating the sheet-shaped material, and upper and lower portions of the sheet-shaped material with respect to a longitudinal axis thereof are perforated by the third and fourth pulsed laser beams, respectively, while being transported along the guiding means.

13. An apparatus for perforating a sheet-shaped material as claimed in claim 12, wherein a longitudinal axis of the guiding means is arranged parallel to each beam axis of said first and second pulsed laser beams.

14. An apparatus for perforating a sheet-shaped material as claimed in claim 12, wherein a longitudinal axis of the guiding means is inclined at a predetermined angle with respect to each beam axis of said first and second pulsed laser beams.

15. An apparatus for perforating a sheet-shaped material, comprising:

means for generating a single pulsed laser beam having a substantially circular shape;

means for beam-splitting said single pulsed laser beam of the substantially circular shape into first and second pulsed laser beams;

first mirror polygon means for beam-splitting said first pulsed laser beam into a plurality of third pulsed laser beams having substantially equal focusing points;

second mirror polygon means for beam-splitting said second pulsed laser beam into a plurality of fourth pulsed laser beams having substantially equal focusing points; and means for guiding the sheet-shaped material along a curve defined by said substantially equal focusing points of said third and fourth pulsed laser beams, whereby said first and second mirror polygons are rotated at a predetermined velocity while perforating the sheet-shaped material, and upper and lower portions of the sheet-shaped material with respect to a longitudinal axis thereof are perforated by the third and fourth pulsed laser beams, respectively, while being transported along the guiding means.

16. An apparatus for perforating a sheet-shaped material as claimed in claim 15, wherein said first and second mirror polygon means are rotated at a speed approximately equal to a transportation velocity of said sheet-shaped material while perforating the upper and lower portions of the sheet-shaped material by said third and fourth pulsed laser beams.

17. An apparatus for perforating a sheet-shaped material as claimed in claim 15, wherein a longitudinal axis of the guiding means is arranged parallel to each beam axis of said first and second pulsed laser beams.

18. An apparatus for perforating a sheet-shaped material as claimed in claim 15, wherein a longitudinal axis of the guiding means is inclined at a predetermined angle with respect to each beam axis of said first and second pulsed laser beams.

19. An apparatus for perforating a sheet-shaped material as claimed in claim 12, wherein said circular single pulsed laser beam is beam-split by projecting a beam center thereof onto a ridge of a beam splitting prism of a triangle-shaped prism to derive said first and second pulsed laser beams each having a substantially semicircular shape.

* * * * *